United States Patent [19]

Fettes et al.

[11] Patent Number: 4,654,971
[45] Date of Patent: Apr. 7, 1987

[54] PRUNNER WITH COLLAPSIBLE DRIVE SHAFT AND HOUSING

[75] Inventors: Ian Fettes, Newport Beach; Gary F. Jervis, Corona, both of Calif.

[73] Assignee: Hudd Enterprises, Las Vegas, Nev.

[21] Appl. No.: 775,805

[22] Filed: Sep. 13, 1985

[51] Int. Cl.⁴ .............................................. B27B 17/02
[52] U.S. Cl. .................................. 30/383; 30/166 R; 30/296 R
[58] Field of Search ...................... 30/122, 296 R, 382, 30/383, 166

[56] References Cited

U.S. PATENT DOCUMENTS

| | | | |
|---|---|---|---|
| 2,777,483 | 1/1957 | Cherem | 30/382 X |
| 2,815,048 | 12/1957 | Davis | 30/383 X |
| 3,291,167 | 12/1966 | Varden | 30/122 |
| 3,657,813 | 4/1972 | Knight | 30/296 R |
| 3,715,805 | 2/1973 | Fraser | 30/166 A |
| 4,122,601 | 10/1978 | Katsuya | 30/166 R |
| 4,505,040 | 3/1985 | Everts | 30/296 R |

Primary Examiner—Jimmy C. Peters
Attorney, Agent, or Firm—Morland C. Fischer

[57] ABSTRACT

An electric motor or gasoline engine driven pruner by which to facilitate the cutting of generally inaccessible or hard to reach trees and shrubs. The pruner includes a rotatable drive shaft, an elongated tubular drive shaft housing surrounding the drive shaft, an electric motor or gasoline engine affixed to one end of the drive shaft housing to rotate the drive shaft, and a cutting head affixed to the outer end of the drive shaft housing to efficiently cut trees and shrubs. A unique arrangement of telescoping, concentrically aligned housing sections surrounds an arrangement of telescoping, concentrically aligned drive shaft sections to permit the pruner to be extended to reach high, and otherwise inaccessible branches and limbs or collapsed to form a compact assembly for easy transport and/or storage.

13 Claims, 20 Drawing Figures

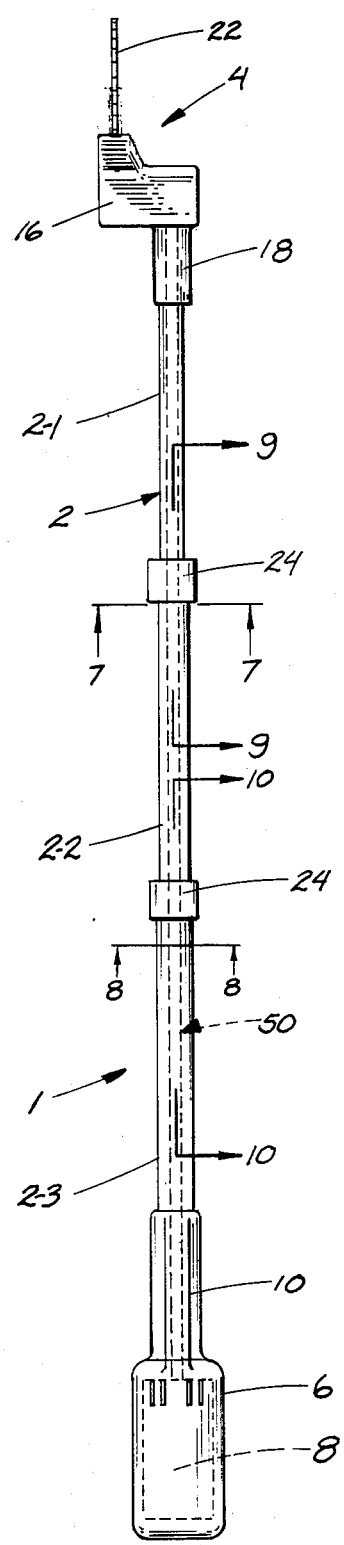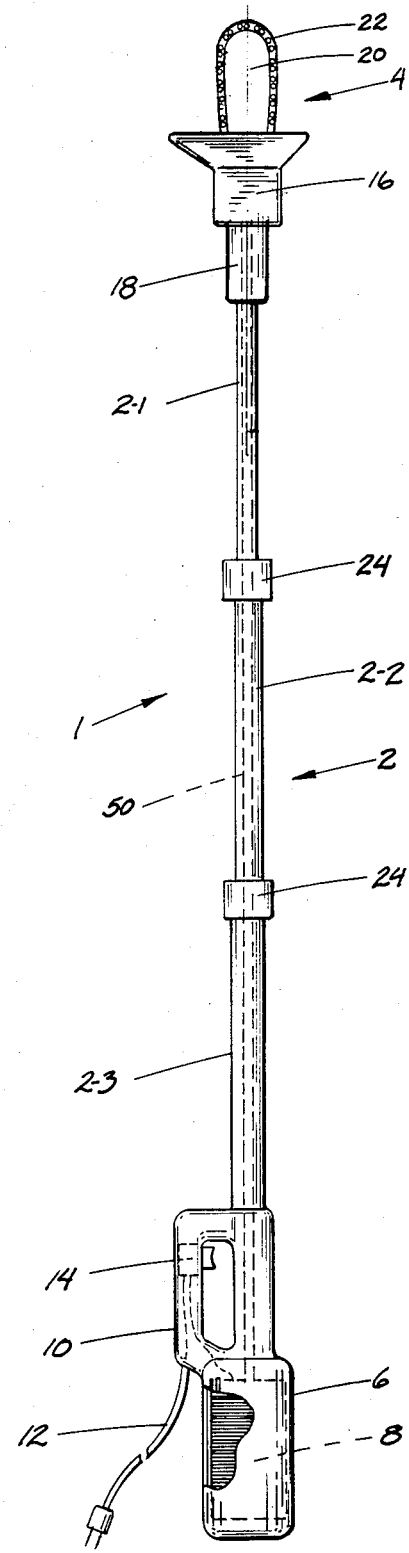

PRUNNER WITH COLLAPSIBLE DRIVE SHAFT AND HOUSING

BACKGROUND OF THE INVENTION

1. Field of the Invention

This invention relates to an electric motor or gasoline engine driven pruner by which to cut otherwise inaccessible trees and shrubs and having collapsible drive shaft and drive shaft housing assemblies.

2. Prior Art

Conventional tree and shrub pruners which are known to the applicant are typically non-motor driven devices that require high degrees of strength and/or force to cut relatively thick branches and limbs. Moreover, such assemblies usually require the expenditure of large amounts of time and energy to complete most pruning jobs. By way of example, a hook saw has long been used to cut low lying tree branches. Another common pruner has a scissors-like cutting head which is remotely controlled by means of an elongated connecting pull rod. Still another well-known pruner is airdriven and, therefore, requires a constant and readily available source of air supply. Hence, such devices may be undesirably characterized by relatively poor efficiency and increased difficulty of operation.

What is more, many of the aforementioned pruners are not sutiable to permit the remote cutting of trees and shrubs. That is, a ladder, stool, or the like is frequently needed to permit the user to reach an otherwise inaccessible branch or limb. Consequently, a ladder or stool may provide an unsafe environment for the user or necessitate the presence of another individual to lend assistance or provide support. However, even with a reach extending ladder or stool, the user may still be unable to penetrate dense branches and limbs without reducing cutting control or possibly injuring his hands and arms. Therefore, such devices are also undesirably characterized by inconvenience and lack of cutting accuracy.

No collapsible pruner arrangement is known in which a rotatable, telescoping drive shaft assembly is surrounding by a telescoping housing assembly. The problems that are overcome by the present invention include preventing the drive shaft and housing assembly sections from pulling apart at such times when the pruner is fully extended to reach high branches and limbs. Moreover, no rotation may be imparted to the housing when the rotatble drive shaft is rotated therewithin. What is more, a bushing/insulator is needed by which to separate the rotatable drive shaft from the housing while permitting the drive shaft and housing assemblies to slide therepast when the pruner is moved to the expanded or collapsed conditions.

Examples of conventional pruners are available by referring to one or more of the following U.S. Pat. Nos.: 2,703,928, Mar. 15, 1955; 3,731,380 May 8, 1973; 3,731,382 May 8, 1973; 4,048,722 Sept. 20, 1977; 4,207,675 June 17, 1980; 4,341,017 July 27, 1982.

SUMMARY OF THE INVENTION

Briefly, and in general terms, an electric motor or gasoline engine drive pruner is disclosed by which to easily and accurately cut trees and shrubs. The pruner includes an elongated, collapsible drive shaft housing assembly having a cutting head attached at one end and a motor or engine attached at the other end. The drive shaft housing assembly includes telescoping upper, intermediate and lower sections which are fastened together, in the fully extended pruner condition, in end-to-end alignment. The housing sections are hollow cylinders which are concentrically arranged relative to one another. The housing sections are contiguously disposed against and slideable past upper and lower carrier bushings so as to permit the housing assembly to be expanded or collapsed.

A rotatable, collapsible drive shaft assembly extends longitudinally through the hollow drive shaft housing assembly between the motor or engine and the cutting head. The drive shaft assembly includes telescoping upper, intermediate and lower sections which, in the fully extended pruner condition, are interconnected in end-to-end alignment. The drive shaft sections are concentrically arranged so as to be slideable into one another, so that the drive shaft assembly may be expanded or collapsed with the housing assembly, whereby the pruner length can be reduced to form a compact package for easy transport and/or storage.

BRIEF DESCRIPTION OF THE DRAWINGS

FIG. 1 is a front elevation of a collapsible electric motor driven pruner which forms one embodiment of the present invention;

FIG. 2 is a side elevation of the pruner of FIG. 1;

DESCRIPTION OF THE PREFERRED EMBODIMENTS

Figure 3:
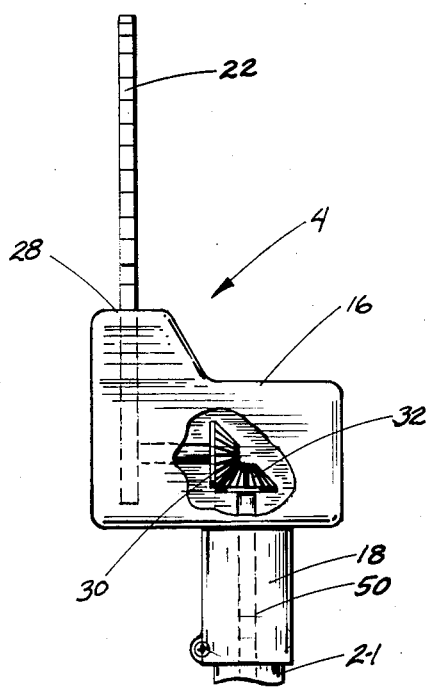
FIG. 3 is a front view of the cutting head of the pruner of FIG. 1.
Figure 4:
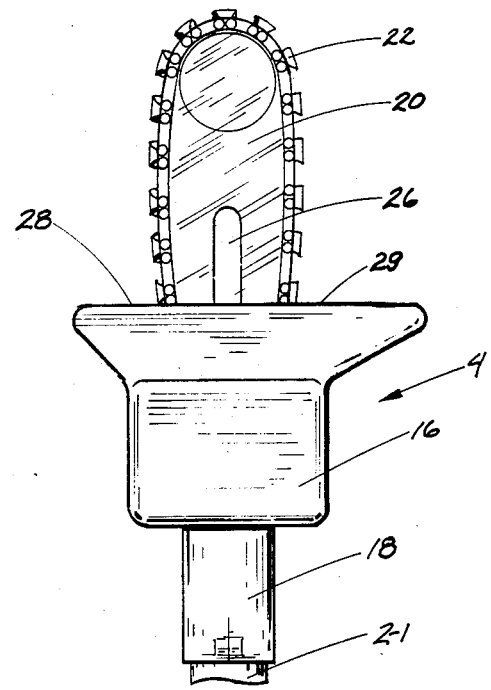
FIG. 4 shows one side of the pruner cutting head.
Figure 5:
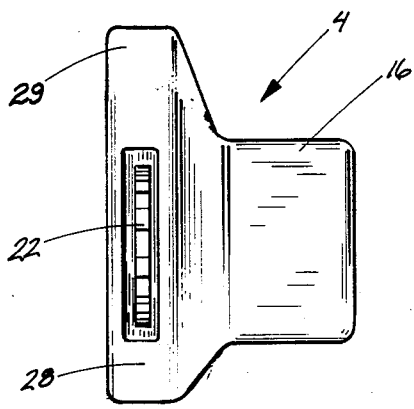
FIG. 5 shows the top of the pruner cutting head.
Figure 6:
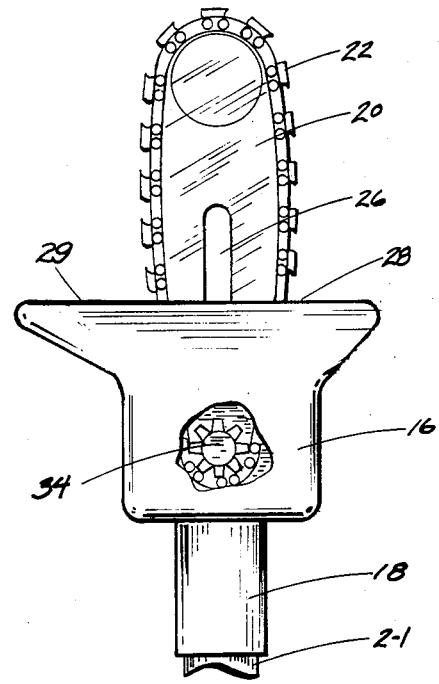
FIG. 6 shows the opposite side of the pruner cutting head.

The pruner 1 which forms the present invention is described while initially referring to FIGS. 1 and 2 of the drawings. The pruner 1 comprises a hollow, collapsible drive shaft housing assembly 2, a cutting head 4 attached at one end of the drive shaft housing assembly 2 and a motor housing 6 attached at the opposite end of the drive shaft housing assembly 2. The motor housing 6 encloses a commercially available motor, such as, for example, a one horsepower electric motor, Model No. M2191, manufactured by Motor Specialties, Inc. Located adjacent motor housing 6 along drive shaft housing 2 is a handle 10. A conventional power cord 12 is connected to motor 8 by way of a power switch 14 (i.e. a trigger). As will apparent to those skilled in the art, power may be applied to energize motor 8 when power cord 12 is connected to a suitable electrical source and trigger 14 is depressed.

The details of cutting head 4 will be described hereinafter while referring to FIGS. 3-6. Briefly, however, cutting head 4 comprises a housing 16 having a hollow sleeve 18 or collar extending dowardly therefrom to receive one end of drive shaft housing assembly 2. Housing 16 surrounds a cutting assembly including a cutting bar 20 and a cutting chain 22. The cutting bar and chain extend upwardly through an opening formed in housing 16 to engage and prune limbs, branches, bushes, and the like.

The drive shaft housing assembly 2 which extends between cutting head 4 and motor housing 6 comprising hollow, tubular upper, intermediate and lower housing sections 2-1, 2-2 and 2-3. Each housing section is typically five feet long. The housing sections 2-1, 2-2 and 2-3 are concentrically aligned relative to one another. Adjacent housing sections (2-1, 2-2 and 2-2, 2-3) are releasably connected together by conventional compression clamps 24. As will be disclosed in greater detail when referring to FIGS. 7-10, a unique collapsible drive shaft assembly 50 extends through the hollow, tubular sections of drive shaft housing assembly 2 to transfer energy and rotary motion from motor 8 to cutting head 4, whereby to cause cutting chain 22 to rotate around cutting bar 20.

The details of cutting head 4 are described while referring concurrently to FIGS. 3-6 of the drawings. As earlier indicated, a cutting assembly comprising a cutting bar 20 and a cutting chain 22 extends from an opening formed in housing 16. Cutting chain 22 is of conventional design and, by way of example only, may be a 26 link, ⅜ pitch chain. An adjustment slot 26 extends longitudinally along cutting bar 20 to permit the position of bar 20 relative to housing 16 to be adjusted to corespondingly vary the tension of cutting chain 22.

Extending horizontally across the top of the cutting head housing 16 and arranged in perpendicular alignment with the upwardly extending cutting bar and chain 20 and 22 is a flat cutting table 28. At least one side 29 of cutting table 28 extends outwardly and away from housing 16 and is of sufficient length to catch and retain a branch or limb across the cutting line of cutting chain 22. Thus, the teeth of chain 22 can easily saw through the branch or limb while advantageously minimizing the likelihood of splintering.

Located at the interior of the cutting head housing 16 and best shown in FIG. 3 is an arrangment of a toothed pinion 30 and ring 32. Teeth of the pinion 30 and ring 32 engage one another to form a 90 degree gear configuration (characterized by, for example, a 2:1 gear reduction), whereby energy from the motor (designated 8 in FIGS. 1 and 2) may be transferred via drive shaft assembly 50 to a sprocket 34 (also at the interior of housing 16 and best shown in FIG. 6) for driving the cutting chain 22 around cutting bar 20.

Figure 7:
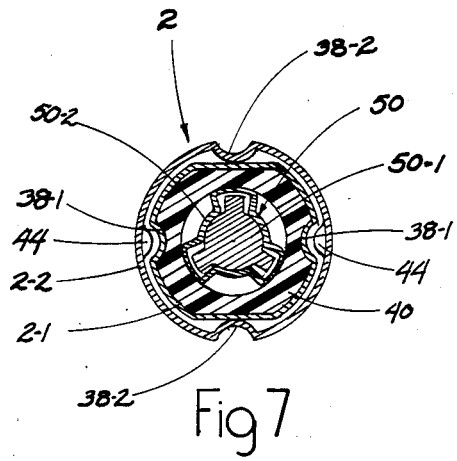
FIG. 7 is a cross-section taken along lines 7—7 of FIG. 1.
Figure 9:
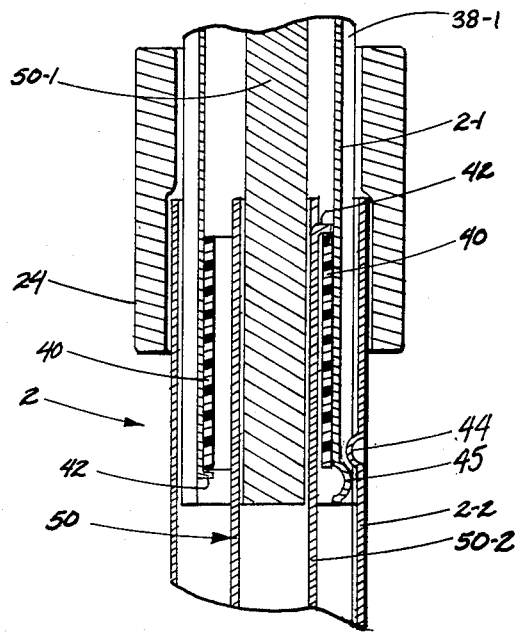
FIG. 9 is a cross-section taken along lines 9—9 of FIG. 1.

In accordance with the present invention, the details of the collapsible pruner drive shaft housing assembly 2 and drive shaft assembly 50 are now described while referring initially to FIGS. 7 and 9 of the drawings. FIGS. 7 and 9 illustrate the drive shaft housing assembly 2 and drive shaft assembly 50 of FIGS. 1 and 2 in a fully extended configuration, when a user wishes to cut relatively high branches or limbs without the use of stools or ladders. In the fully extended condition, the upper, intermediate and lower housing sections 2-1, 2-2 and 2-3 (with only the upper and intermediate sections 2-1 and 2-2 being shown in FIGS. 7 and 9) are aligned end-to-end. More particularly, the upper and intermediate tubular drive shaft housing sections 2-1 and 2-2 are arranged concentrically with one another with a lower portion of housing section 2-1 being surrounded by an upper portion of housing section 2-2. A compression clamp 24 is tightened down and around the overlapping ends of housing sections 2-1 and 2-2 in order to releasably secure such housing sections together. The upper and intermediate drive shaft housing sections 2-1 and 2-2 are preferably formed from a lightweight metallic material, such as aluminum, or the like.

Each of the drive shaft housing sections 2-1 and 2-2 is provided with a respective pair of longitudinally extending arcuate grooves 38-1 and 38-2. As will soon be explained when referring to FIGS. 11b and 11c, the grooves 38-1 of upper drive shaft housing section 2-1 are aligned to receive therewithin respective dimples 44 from the intermediate drive shaft housing section 2-2 to prevent the rotation of housing section 2-1 relative to housing section 2-2. As is best shown in FIG. 9, the upper drive shaft housing section 2-1 is provided with a dimple 45. Dimples 44 and 45 are aligned to engage and oppose one another and thereby preventing the disengagement of upper and intermediate housing sections 2-1 and 2-2 during the extension of drive shaft housing assembly 2.

The rotating drive shaft assembly 50 includes upper, intermediate and lower drive shaft sections (with only the upper and intermediate drive shaft sections 50-1 and 50-2 being shown in FIGS. 7 and 9) which, in the fully extended pruner conditon, are aligned end-to-end. The upper drive shaft section 50-1 has a solid cross-section and is preferably manufactured from a lightweight material, such as aluminum, or the like. The intermediate drive shaft section 50-2 is preferably extruded from aluminum, or the like, and has a generally hollow cross-section. Upper and intermediate shaft sections 50-1 and 50-2 are concentrically arranged relative to one another and centrally disposed within drive shaft housing assembly 2. As is best shown in FIG. 9, an (approximately 2 inch) lower portion of drive shaft section 50-1 is surrounded by and adapted to be coupled to an (approximately 2 inch) upper portion of drive shaft section 50-2, so that rotary motion may be efficiently transferred therebetween.

A cylindrical carrier bushing 40 having a hollow crosssection is located at the interior of drive shaft housing assembly 2. Carrier bushing 40 is preferably manufactured from a suitable wear-resistant and insulating material, such as that known as DELRIN, TEFLON, or the like. In the assembled drive shaft relationship, and as is also best shown in FIG. 9, the portions of upper and intermediate drive shaft sections 50-1 and 50-2 which are coupled to one another are disposed at the hollow interior of carrier bushing 40. Moreover, bushing 40 is surrounded by and arranged contiguously with the upper drive shaft housing section 2-1, so as to prevent the errosion of housing section 2-1 during the rotation of drive shaft sections 50-1 and 50-2 and permit housing section 2-1 to slide past bushing 40 when the housing assembly 2 is extended or compressed.

To limit the lateral displacement of carrier bushing 40, each of the upper housing section 2-1 and intermediate drive shaft section 50-1 (between which bushing 40 is positioned) is provided with a locking tang 42. Locking tangs 42 extend outwardly from sections 2-1 and 50-2 and across opposite ends of carrier bushing 40, so that bushing 40 will travel through housing assembly 2 when the pruner is either extended or collapsed. That is, the location of carrier bushing 40 is controlled by the movements of either the housing section 2-1 or the drive shaft section 50-2, such that bushing 40 is adapted to float through drive shaft housing assembly 2 and between locking tangs 42 depending upon whether the pruner is fully or partially expanded or collapsed.

Figure 8:
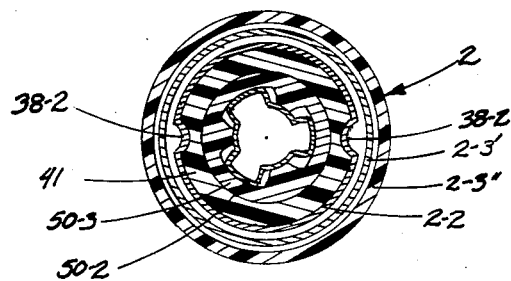
FIG. 8 is a cross-section taken along lines 8—8 FIG. 1.
Figure 10:
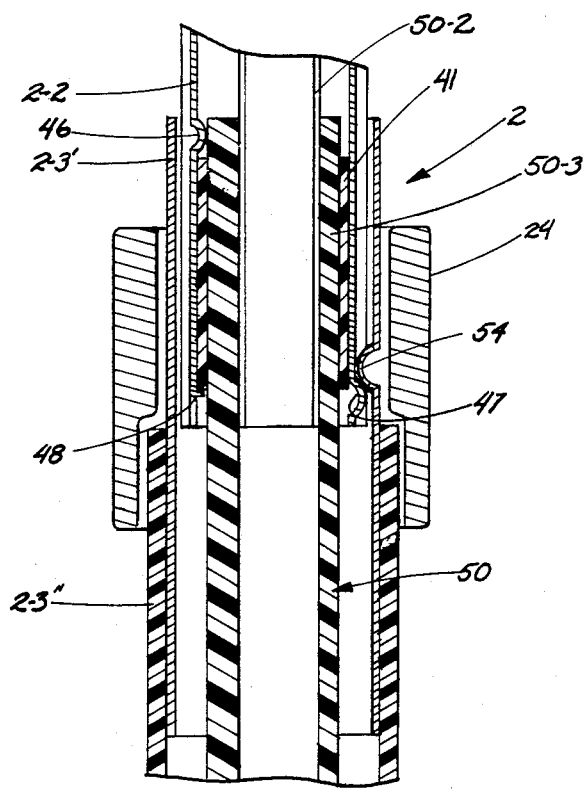
FIG. 10 is a cross-section taken along lines 10—10 of FIG. 1.

The details of the drive shaft housing assembly 2 and drive shaft assembly 50 in the fully extended condition continue to be described while now referring to FIGS. 8 and 10 of the drawings. More particularly, the tubular intermediate and lower drive shaft housing sections 2-2 and 2-3 of housing assembly 2 are arranged concentrically with one another with a lower portion of housing section 2-2 being surrounded by a top portion (designated 2-3') of housing section 2-3. The intermediate and lower drive shaft sections 2-2 and 2-3 are releasably secured together by a compression clamp 24 which is tightened down and around the overlapping ends thereof. As earlier disclosed, the intermediate drive shaft housing section 2-2 is manufactured from aluminum, or the like. The lower drive shaft housing section 2-3 comprises an (approximately 6 inch) top tube member 2-3' and an (approximately 4½ foot) bottom tube member 2-3''. Top drive shaft housing tube member 2-3' is surrounded by and secured to the bottom tube member 2-3''. The top tube member 2-3' is fabricated from a metal, such as aluminum, to accommodate the compression clamp 24, and the bottom tube member 2-3'' is manufactured from a non-conducting insulator, such as a plastic material.

The intermediate drive shaft housing section 2-2 is provided with a pair of arcuate grooves 38-2 (also illustrated in FIG. 7) which extend along the length thereof. The particular advantages of grooves 38-2 will be discussed when referring to FIG. 11b. As is best shown in FIG. 10, each of the intermediate drive shaft housing section 2-2 and the top portion 2-3' of bottom housing section 2-3 is provided with a respective dimple 47 and 54. Dimples 47 and 54 are in extended alignment to engage and oppose one another and thereby prevent the intermediate and lower housing sections 2-2 and 2-3 from disengaging during the extension of drive shaft housing assembly 2.

The rotating drive shaft assembly 50 of FIGS. 8 and 10 include intermediate and lower drive shaft sections 50-2 and 50-3. As earlier disclosed, the intermediate drive shaft section 50-2 is manufactured from aluminum and has a hollow cross-section. The lower drive shaft section 50-3 is manufactured from a non-conducting insulating material, such as plastic, and also has a hollow cross-section. Intermediate and lower drive shaft sections 50-2 and 50-3 are concentrically arranged relative to one another and centrally disposed through drive shaft housing assembly 2. As is best shown in FIG. 10, an (approximately 2 inch) lower portion of drive shaft section 50-2 is surrounded by and coupled to an (approximately 2 inch) upper portion of drive shaft section 50-3, so that rotary motion may be efficiently transferred therebetween.

Another cylindrical DELRIN carrier bushing 41 having a hollow cross-section and being similar in construction to the bushing 40 of FIGS. 7 and 9 is located at the interior of drive shaft housing assembly 2. In the assembled drive shaft relationship, and as is also best shown at FIG. 10, the portions of intermediate and lower drive shaft sections 50-2 and 50-3 which are coupled to one another are disposed within the hollow interior of carrier bushing 41. Moreover, bushing 41 is surrounded by and arranged contiguously with the intermediate drive shaft housing section 2-2, so as to prevent the erosion of housing section 2-2 and permit housing section 2-2 to slide past bushing 41 when the housing assembly 2 is extended or collapsed.

To limit the lateral displacement of carrier bushing 41, the intermediate drive shaft housing section 2-2 is provided with a locking dimple 46 and a locking tang 48. The locking dimple and tang 46 and 48 extend outwardly from housing section 2-2 and across opposite ends of carrier bushing 41, so that bushing 41 will ride along with drive shaft housing section 2-2 when the pruner is either extended or collapsed. However, unlike the bushing 40 of FIGS. 7 and 9 (which is adapted to float through drive shaft housing assembly 2), the position of bushing 41 through drive shaft housing assembly 2 is totally dependent upon the location of intermediate drive shaft housing section 2-2.

The details of the components which form the drive shaft housing assembly 2 and drive shaft assembly 50 for the collapsible pruner of the present invention are best described while referring to FIG. 11. In FIG. 11a, the top tube member 2-3' which forms the lower drive shaft housing section 2-3 is shown having a pair of oppositely disposed and inwardly projecting dimples 54. A portion of the lower housing section tube member 2-3' surrounds and engages a portion of the intermediate drive shaft housing section 2-2 of FIG. 11b, such that, in the assembled drive shaft housing 2, the dimples 54 of tube member 2-3' are received in mating engagement within respective arcuate grooves 38-2 of intermediate housing section 2-2. The grooves 38-2 extend longitudinally along intermediate drive shaft housing section 2-2 and, when in receipt of dimples 54, prevent the rotation of intermediate housing section 2-2 relative to lower housing section 2-3.

Figure 11A:
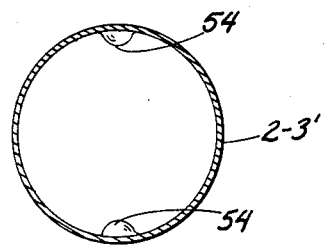
FIGS. 11a–11h show the respective components which form the collapsible drive shaft and housing assemblies which form the pruner of FIG. 1.
Figure 11G:
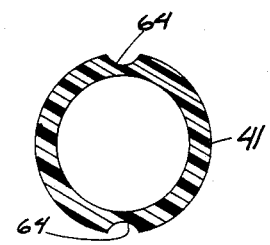
Figure 11B:
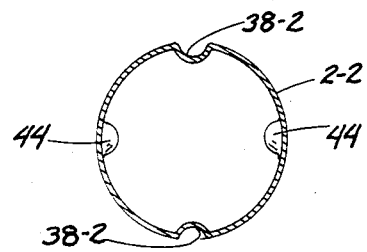

Intermediate drive shaft housing section 2-2 of FIG. 11b also includes a pair of oppositely disposed and inwardly projecting dimples 44. A portion of intermediate drive shaft housing section 2-2 surrounds and engages a portion of the upper drive shaft housing 2-1 of FIG. 11c, such that, in the assembled drive shaft housing 2, the dimples 44 of intermediate housing section 2-2 are received in mating engagement within the respective arcuate grooves 38-1 of upper housing section 2-1. The grooves 38-1 extend longitudinally along upper drive shaft housing section 2-1 and, when in receipt of dimples 44, prevent the rotation of upper housing section 2-1 relative to intermediate housing section 2-2. Also in the assembled drive shaft housing 2 and during the extension or collapse of the present pruner, the arcuate grooves 38-2 of intermediate drive shaft housing section 2-2 are adapted to be received against and slide past a pair of oppositely disposed flat end surfaces 58 of upper drive shaft housing 2-1 (best illustrated in FIG. 7).

Figure 11D:
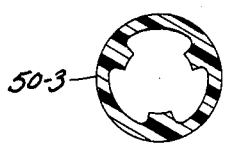
Figure 11C:
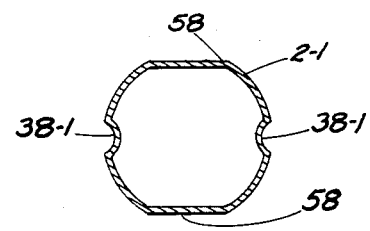
Figure 11H:
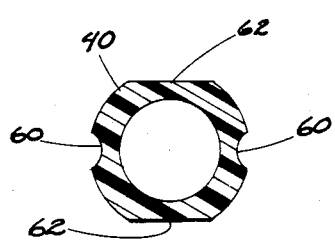

As was earlier described, the carrier bushing 40 of FIG. 11h is surrounded by and arranged contiguously with the upper drive shaft housing section 2-1 (best illustrated in FIG. 7) so as to permit housing section 2-1 to slide therepast when the present pruner is extended or collapsed. More particularly, carrier bushing 40 includes pairs of oppositely disposed arcuate notches 60 and flats 62. When carrier bushing 40 is located at the hollow interior of upper drive shaft housing section 2-1, the grooves 38-1 and flat end surfaces 58 of housing section 2-1 of FIG. 11c are aligned for engagement with the notches 60 and flats 62, respectively, of bushing 40. As was also earlier described, the carrier bushing 41 of FIG. 11g is surrounded by and arranged contiguously with the intermediate drive shaft housing section 2-2 (best illustrated in FIG. 8). More particularly, carrier bushing 41 includes a pair of oppositely disposed arcuate notches 64. When carrier bushing 41 is located at the hollow interior of intermediate drive shaft housing section 2-2 of FIG. 11b, the arcuate grooves 38-2 of housing section 2-2 are respectively aligned for receipt of the notches 64 of bushing 41.

Accordingly, and by virtue of the present drive shaft housing assembly 2, portions of the concentrically arranged upper, intermediate and lower drive shaft housing sections 2-1, 2-2 and 2-3 are telescopically interconnected in end-to-end alignment with one another (when compression clamps 24 are tightened), such that rotation of the housing assembly is prevented during the rotation of the drive shaft assembly 50. Moreover, because of the slideable engagement of drive shaft sections 2-1 and 2-2 along carrier bushings 40 and 41, respectively, the telescopically connected housing sections may be easily extended to any length or collapsed into a compact pruner package (when compression clamps 24 are loosened).

Figure 11E:
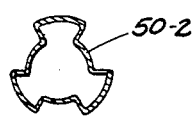
Figure 11F:
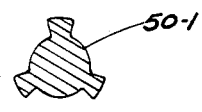

As was also previously disclosed, a portion of the upper drive shaft section 50-1 of FIG. 11f is surrounded by and coupled to the hollow intermediate drive shaft section 50-2 of FIG. 11e. More particularly, upper drive shaft section 50-1 is a splined shaft of solid cross-section. The interior of intermediate drive shaft section 50-2 has a hollow, splined configuration which is adapted to receive and retain some of the splined upper drive section 50-1 therewithin (best illustrated in FIG. 7). Similiary, a portion of the hollow intermediate drive shaft section 50-2 is surrounded by and coupled to the hollow lower drive shaft section 50-3 of FIG. 11d. More particularly, the interior of lower drive shaft section 50-3 has a configuration which is adapted to receive and retain the hollow splined intermediate drive shaft section 50-2 therewithin (best shown in FIG. 8). Accordingly, portions of the concentrically arranged upper, intermediate and lower drive shaft sections 50-1, 50-2 and 50-3 are telescopically coupled together in end-to-end alignment with one another so that rotary motion may be transferred from an energy source (e.g. the motor 8 of FIGS. 1 and 2) to the pruner cutting head (designated 4 in FIGS. 1 and 2). What is more, and as is best illustrated in FIGS. 7 and 9, allowance is made for sufficient backlash in the couplings of drive shaft sections 50-1 to 50-2 and 50-2 to 50-3 so as to minimize lockup-up as a consequence of the twisting of drive shaft sections 50-1, 50-2 and 50-3.

As was also previously disclosed, the lower drive shaft section 50-3 of FIG. 11d is surrounded by the hollow carrier bushing 41 of FIG. 11g, so as to be slideable through the interior thereof. Moreover, the intermediate drive shaft section 50-2 of FIG. 11e is surrounded by the hollow carrier bushing 40 of FIG. 11h so as to be slideable through the interior thereof. Thus, the telescopic coupling of the concentrically arranged drive shaft sections permit the drive shaft assembly 50 to be easily extended to any length or collapsed past bushings 40 and 41 into a compact package, depending upon the extended or collapsed condition of housing assembly 2.

Figure 12:
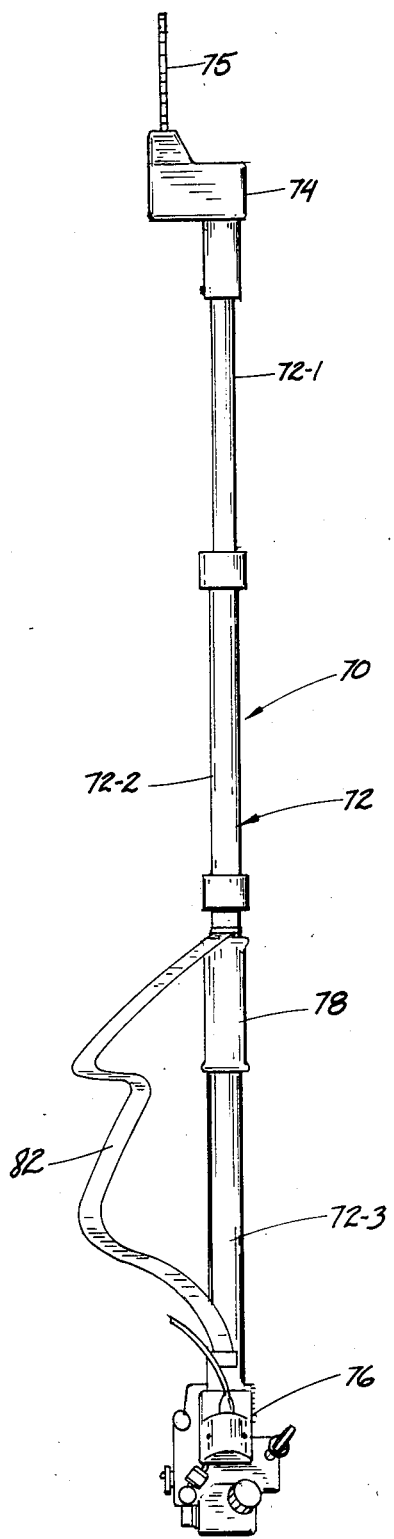
FIG. 12 is a front elevation of a collapsible gasoline engine driven pruner which forms a second emboidment of the present invention.
Figure 13:
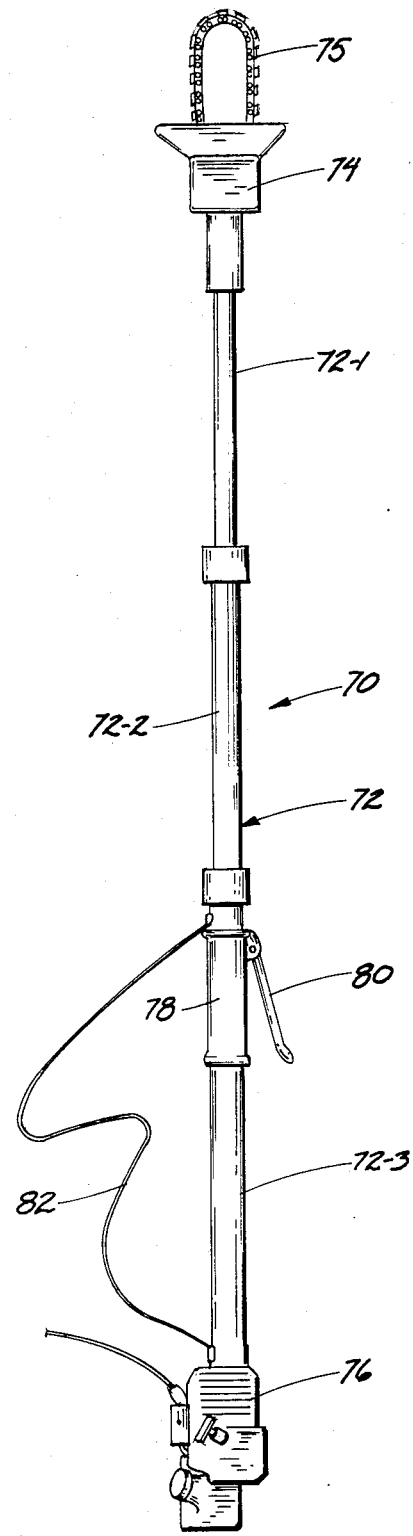
FIG. 13 is a side elevation of the pruner of FIG. 12.

A pruner 70 which forms another embodiment of the present invention is now described while referring to FIGS. 12 and 13 of the drawings. Like the pruner 1 of FIGS. 1 and 2, the pruner 70 comprises a hollow, collapsible drive shaft housing assembly 72 and a cutting head 74 (having a cutting chain 75) attached at one end of the drive shaft housing assembly 72. However, unlike the aforementioned pruner 1, a gasoline engine 76 is attached to the other end of drive shaft housing assembly 72. The gasoline engine 76 is a commercially available engine, such as, for example, a 22.5 cc engine, Model No. G2D, manufactured by Zenoah Corporation.

The drive shaft housing assembly 72 comprises tubular upper, intermediate and lower drive shaft housing sections 72-1, 72-2 and 72-3 which are concentrically aligned and telescopically interconnected with one another and similar in construction and operation of the previously disclosed drive shaft housing sections 2-1, 2-2 and 2-3 of FIGS. 1 and 2. Pruner 70 also includes a rotatable and collapsible drive shaft assembly (not shown) which comprises telescoping upper, intermediate and lower drive shaft sections which are concentrically aligned with one another and similar in construction and operation to the previously disclosed drive shaft sections 50-1, 50-2 and 50-3 of FIGS. 1 and 2. The drive shaft assembly extends longitudinally through the hollow interior of drive shaft housing assembly 72 between engine 76 and cutting head 74.

Located along lower drive shaft housing section 72-3 is a throttle 78 for gasoline engine 76. Throttle 78 includes a throttle lever 80 to control the operation of the engine 76 and the rotation of the drive shaft assembly. An adjustable shoulder strap is secured to opposite portions of the lower drive shaft housing section 72-3 to enable the pruner 70 to be conveniently carried on the shoulder of a user. In the present pruner embodiment, the engine 76 is attached to housing assembly 72 opposite the location of cutting head 74. Thus, the weight of the pruner 70 is advantageously distributed at opposite ends of housing assembly 72, making the pruner 70 easier to balance and use.

In the presently disclosed invention, a unique, collapsible drive shaft is adapted to drive the cutting head of either pruner embodiment 1 or 70 (by way of a conventional adapter) regardless of whether an electric motor or gasoline engine is employed. What is more, the fully extended pruner can reach a height of approximately 15 feet. However, for cutting lower lying branches and limbs, the length of the pruner may be easily adjusted by collapsing one or more of the drive shaft housing sections. In the fully collapsed condition, the pruner of the present invention may be reduced to a length of approximately 5 feet (i.e. corresponding to the length of the lower drive shaft section), so as to facilitate convenient transport and/or storage in a manner that has heretofore been unavailable with pruners of the prior art.

It will be apparent that while a preferred embodiment of the present invention has been shown and described, various modifications and changes may be made without departing from the true spirit and scope of the invention.

Having thus set forth the preferred embodiments of the present invention, what is claimed is:

1. A portable, collapsible pruner for cutting limbs, branches, and the like, and including:
   hollow, elongated housing assembly means comprising a plurality of telescoping, tubular housing sections concentrically aligned with one another;
   rotatable, elongated drive shaft assembly means extending through said housing assembly means and comprising a plurality of telescoping, tubular drive shaft sections concentrically aligned with one another;

wear-resistant bearing means located between said housing assembly means and said drive shaft assembly means, said bearing means having inner and outer bearing surfaces over which said drive shaft sections and said housing sections respectively slide when said drive shaft and housing assembly means are extended or collapsed;

power source means interconnected with said drive shaft assembly means at one end thereof for rotating said drive shaft assembly means; and cutting means interconnected with said drive shaft assembly means at the opposite end thereof so as to be driven by said drive shaft assembly means.

2. The collapsible pruner recited in claim 1, wherein said housing sections of said housing assembly means include protrusions which extend therefrom and engage said bearing means to control the movement of said bearing means when said housing assembly means is extended or collapsed.

3. The collapsible pruner recited in claim 1, wherein said housing sections of said housing assembly means include respective interlocking means which are aligned to engage one another and thereby prevent the disengagement of successively interconnected housing sections when said housing assembly means is fully extended.

4. The collapsible pruner recited in claim 1, wherein said housing sections of said housing assembly means include respective interlocking means which are aligned to engage one another and thereby prevent the rotation of successively interconnected housing sections relative to one another.

5. The collapsible pruner recited in claim 1, wherein first ends of said drive shaft sections of said drive shaft assembly means are coupled to second ends of succeeding drive shaft sections, so that said drive shaft sections can be arranged in end-to-end alignment through said hollow housing assembly means.

6. The collapsible pruner recited in claim 1, wherein said cutting means includes a housing and a cutting chain extending outwardly from said housing, said housing having a flat table projecting thereacross in perpendicular alignment with said cutting chain for receiving limbs and branches thereagainst.

7. The collapsible pruner recited in claim 1, wherein said power source means is an electric motor.

8. The collapsible pruner recited in claim 1, wherein said power source means is a gasoline engine.

9. The collapsible pruner recited in claim 1, wherein at least one of said housing sections is formed from a non-conducting electrically insulating material.

10. A portable collapsible pruner for cutting limbs and branches and comprising:
a hollow housing assembly having a plurality of telescoping tubular housing members concentrically arranged with one another, said housing members having raised dimples and recessed pockets, the pockets of one of said housing members aligned to receive the dimples of another of said housing members to prevent the rotation of said housing members relative to one another;
a rotatable drive shaft assembly extending through said hollow housing assembly and having a plurality of telescoping drive shaft members concentrically arranged with and mated to one another;
guide surface means located at the interior of said housing assembly and surrounding said drive shaft assembly, said guide surface means having guide surfaces over which said housing and drive shaft members slide when said housing and drive shaft assemblies are extended or collapsed;
power source means interconnected with said drive shaft assembly at one end of said housing assembly; and
cutting means interconnected with said drive shaft assembly at the other end of said housing assembly;
said housing assembly members and said drive shaft assembly members adapted to be respectively extended in end-to-end alignment or collapsed so that one concentrically aligned member is received within a successive concentrically aligned member.

11. The collapsible pruner recited in claim 10, wherein said housing assembly members include respective interlocking means which are aligned to engage one another and thereby prevent the end-to-end disengagement of successively aligned members.

12. The collapsible pruner recited in claim 10, wherein said guide surface means have pockets formed therein for receiving the raised dimples of respective ones of said housing members when said housing members slide over said guide surface means.

13. The collapsible pruner recited in claim 10, wherein an air space is formed between the ends of successively mated drive shaft members, said air space compensating for backlash of said drive shaft members as a consequence of twisting said drive shaft assembly.

* * * * *